United States Patent [19]

Coster

[11] Patent Number: 4,824,907

[45] Date of Patent: Apr. 25, 1989

[54] PREPARATION OF THERMOFORMED PLASTICS ARTICLES

[75] Inventor: Harmen Z. K. Coster, Amsterdam, Netherlands

[73] Assignee: Borg-Warner Chemicals, Inc., Parkersburg, W. Va.

[21] Appl. No.: 166,127

[22] Filed: Mar. 9, 1988

Related U.S. Application Data

[63] Continuation of Ser. No. 842,231, Mar. 21, 1986.

[30] Foreign Application Priority Data

Apr. 2, 1985 [GB] United Kingdom ............... 8508602

[51] Int. Cl.$^4$ .................... C08L 47/00; C08L 51/04
[52] U.S. Cl. ..................................... 525/86; 525/87; 525/234
[58] Field of Search ............................ 525/234, 86, 87

[56] References Cited

U.S. PATENT DOCUMENTS

3,928,495 12/1975 Dalton .................................. 325/86
4,362,850 12/1982 Burk ..................................... 525/86

*Primary Examiner*—Jacob Ziegler
*Attorney, Agent, or Firm*—Richard J. Schlott; Thomas B. Hunter

[57] ABSTRACT

Moulded articles of uniform wall thickness are prepared by vacuum-forming or thermoforming a composition comprising a uniform blend of, as base resin, a moulding grade resin having a continuous phase of a first copolymer of a styrenic monomer and an ethylenically unsaturated nitrile and a minor proportion of, as additive resin, a second copolymer of a styrenic monomer and an ethylenically unsaturated nitrile having an ultra high molecular weight, the forming operation being carried out at least 50° C. above the glass transition temperature of the base resin and at a stress level of at most 1 MPa.

10 Claims, 7 Drawing Sheets

PREPARATION OF THERMOFORMED PLASTICS ARTICLES

This is a continuation of application Ser. No. 842,231 filed Mar. 21, 1986.

BACKGROUND OF THE INVENTION

The present invention relates to the preparation of plastics articles by vacuum forming or thermoforming.

Resinous compositions based on copolymers of a styrenic monomer and an ethylenically unsaturated nitrile, in particular styrene/acrylonitrile copolymers (SAN resins), find use in a variety of applications on account of their toughness and resistance to chemicals, sunlight and the weather. Unmodified such copolymers are relatively brittle and to improve their impact strength it has long been known to disperse uniformly throughout a continuous phase of the styrenic monomer/nitrile copolymer a discrete elastomeric phase of an impact modifier. To improve compatibility between the continuous and disperse phases, the impact modifier usually is a graft copolymer comprising a rubbery substrate, such as a poly 1,4-butadiene or copolymer of 1,4-butadiene with either or both of styrene and acrylonitrile, and a grafted superstrate of styrenic monomer/nitrile copolymer. The resulting dispersions are best known in the form of ABS resins.

The resinous compositions based on styrenic monomer/nitrile copolymers, whether modified or unmodified, are used as engineering thermoplastics to form a variety of shaped articles, frequently of thin wall structure, by processes involving elongational flow, such as vacuum forming or thermoforming. For example, such articles as refrigerator linings and boats can be formed by vacuum- or thermo-forming sheets of ABS resin compositions. A problem encountered when forming such articles is that of uneven wall thickness, so that the wall thickness in areas, such as corners, subjected to high levels of deformation is less than in areas, such as long stretches of straight wall, subjected to low levels of deformation. To overcome this problem, and provide articles of sufficient strength and more uniform wall thickness, it has frequently been necessary to increase the thickness of the sheets of resin composition used in the moulding process. This, however, results in the use of increased amounts of resin and is wasteful in that the wall thickness in areas which have been subjected to low levels of deformation is greater than is required in practice.

GB-A-No. 2111514 describes a thermoplastics resin composition suitable for preparing biaxially oriented materials which comprises a base thermoplastics resin and and a thermoplastics resin B compatible therewith having a molecular weight of more than $10^6$ and obtained by the polymerisation of at least one vinyl monomer. In the preparation of biaxially oriented materials it is necessary to employ temperatures close to the glass transition temperature of the base resin A and relatively high stress levels (usually at least $2 \times 10^6$ Pa up to $10^7$ Pa). Under these conditions the relaxation times of the resin molecules are long and the moecules remain oriented in the final product to provide it with the desired mechanical properties. If the temperatures employed are too high, for example 30° to 40° C. above the glass transition temperature of the base resin, or the stress levels too low, for example $1 \times 10^6$ Pa, then the relaxation times of the resin molecules are short and there is insufficient residual orientation to provide the desired balance of physical properties in the final product.

By way of contrast vacuum-forming or thermo-forming operations are usually carried out at temperatures significantly (at least 40° C.) above the glass transition temperature of a base resin and at relatively low stress values ($10^6$ Pa or below corresponding to the subatmospheric pressure applied). A problem then is, as mentioned above, to achieve reasonably uniform wall thicknesses in moulded articles during the preparation of which significantly different levels of deformation are encountered because of the shape of the articles. Put another way, the elongational viscosity of the moulding composition under the forming conditions should decrease as little as possible with increases in the level of stress.

SUMMARY OF THE INVENTION

The present invention provides a process for preparing shaped articles by vacuum forming or thermoforming using moulding compositions which are based upon styrenic monomernitrile copolymers and which have improved elongated flow properties such that shaped articles of more uniform wall thickness can be prepared from them. In addition the creep resistance of the shaped articles prepared in accordance with the invention is significantly improved.

DETAILED DESCRIPTION OF THE PREFERRED EMBODIMENTS

According to the present invention there is provided a process for preparing shaped articles which comprises forming a moulding composition comprising a blend of, as base resin, a resin having a continuous phase of a first copolymer of a styrenic monomer and an ethylenically unsaturated nitrile, said first copolymer having a number average molecular weight of from $3 \times 10^4$ to $1 \times 10^5$, preferably from $3.5 \times 10^4$ to $7 \times 10^4$, more preferably from $4 \times 10^4$ to $5.5 \times 10^4$, and, as additive resin, from 0.1 to 20, preferably 1 to 6, more preferably 2 to 4, parts by weight per 100 parts by weight of base resin of a second copolymer of a styrenic monomer and an ethylenically unsaturated nitrile, said second copolymer having a number average molecular weight of from $3 \times 10^5$ to $3 \times 10^6$, preferably from $5 \times 10^5$ to $2 \times 10^6$, more preferably from $8 \times 10^5$ to $1.6 \times 10^6$, at a termperature at least 40° C., preferably at least 50° C. and more preferably at least 60° C. (in the case of plasticised blends), above the glass transition temperature of the base resin and at a stress level of at most $10^6$ Pa.

Both the first and second copolymers in the moulding compositions to be used in the process of the invention are of a styrenic monomer and an ethylenically unsaturated nitrile. The styrenic monomer can be styrene itself or various derivations of styrene in which either or both of the benzene ring and the vinyl group can be substituted, as by, for example, an alkyl group or a halogen atom. Thus, examples of the styrenic monomer are styrene, ortho-, meta- and para-methyl styrenes, 2,4-dimethyl styrene, ortho-, meta- and para-ethyl styrenes, paratertiary styrene, alpha-methyl styrene, alpha-ethyl styrene, alpha-methyl-para-methyl styrene, the ortho-, meta- and para-chloro styrenes, 2,4-dibromo styrene and 2-4-dichloro sytrene. The ethylenically unsaturated nitriles that can be employed include acrylonitrile, methacrylonitrile and ethacrylonitrile. Mixtures of styrenic monomers and of nitriles can be employed if desired. The first and second copolymers will usually comprise 65 to 90% by weight of the styrenic monomer and 35 to 10% by weight of the nitrile monomer.

In order that the first and second copolymers be as compatible as possible and that the elongational viscosity decrease as little as possible with the applied stress, it is desirable to match the weight ratio of styrenic monomer/nitrile monomer in the two copolymers. Thus, the weight ratio of styrenic monomer to ethylenically unsaturated nitrile in said additive resin preferably is from 1.1 to 0.9 times, and more preferably is slightly greater than (for example 1.1 to 1.05 times), the weight ratio of styrenic monomer to ethylenically unsaturated nitrile in the base resin. Preferably the first and second copolymers are both styrene/acrylonitrile copolymers.

The first and second copolymers of the moulding compositions used in the process of the invention differ in terms of their molecular weight. The first copolymer has a molecular weight typical of styrenic monomer/nitrile copolymers for use as engineering thermoplastics. The upper limit on molecular weight is usually determined by processability limitations, while the lower limit is frequently determined by the need for the moulding composition to be impact resistant. The molecular weights that have been quoted for the first and second copolymers are number average molecular weights. The molecular weight distribution of the first copolymer is usually such that the ratio of weight average molecular weight to number average molecular weight is from 2 to 2.5, preferably from 2.2 to 2.4. For the second styrenic monomer/nitrile copolymer, the molecular weight distribution can be broad at the lower end of the molecular weight range so that the weight average molecular weight/number average molecular weight ratio at the lower end of the range can be about 2.2:1, at the upper end of the range it preferably is as low as 1.2:1 or 1.3:1.

In the moulding compositions used in the process of the invention the base resin must have a continuous phase of the first copolymer. The base resin is preferably and ABS resin, as discussed above. Other examples of base resins are unmodified SAN resins, SAN resins modified with chlorinated polyethylene (ACS), SAN resins modified with ethylene/propylene/dimer rubbers (AES), SAN resins modified with acrylic rubbers (ASA) and blends of such resins. The only requirement is that the styrenic monomer/nitrile copolymer should form a continuous phase during processing operations. Preferably the continuous phase has dispersed therein a rubbery impact modifier, preferably an elastomeric polymer of 1,4-butadiene. Particularly preferred impact modifiers are graft copolymers comprising as substrate a rubbery polybutadiene or copolymers of butadiene with either or both of styrene and acrylonitrile, such as a copolymer containing 90 to 95% by weight butadiene and 5 to 10% by weight of sytrene and/or acrylonitrile, and as superstrate a styrene/acrylonitrile copolymer. In such a graft copolymer the butadiene content is suitably from 10 to 60%, based on monomer content.

The second styrenic monomer/nitrile copolymer in the moulding compositions used in the process of the invention is an additive resin of much higher molecular weight than the first copolymer resin providing the continuous phase of the base resin. This second copolymer can be referred to as an ultra-high molecular weight (UHMW) copolymer. Such UHMW-copolymers can be prepared using standard polymerisation technology, providing no or very little chain transfer agent is used in the polymerisation. Polymers made in this way can contain considerable amounts of lower molecular weight polymer chains which may or may not be removed before the UHMW-copolymer is blended with the other ingredients of the composition. One UHMW-SAN resin which is commercially available is "Plastiflo AO1" manufactured by Ugine Kuhlmann. The presence of a small amount of the UHMW copolymer in the continuous phase of the first styrenic monomer/nitrile copolymer promotes an effect known as "strain hardening" with the result that, upon moulding of the composition, deformation preferentially takes place in relatively undeformed areas, so that articles having a more uniform wall thickness are produced by the moulding process of the invention which is dominated by stretching flow. If, for example, both the first and second stryenic monomer/nitrile copolymers were to be made by emulsion polymerisation simple latex blending of the products could be employed in producing a molding composition for use in the process of the invention.

EXAMPLES

The "strain-hardening" effect achieved in accordance with the present invention can be illustrated by comparing constant stress creep curves at 140° C. on compositions containing no or differing amounts of the UHMW-copolymer. Such curves are illustrated in FIGS. 1 to 3.

Figure 1:
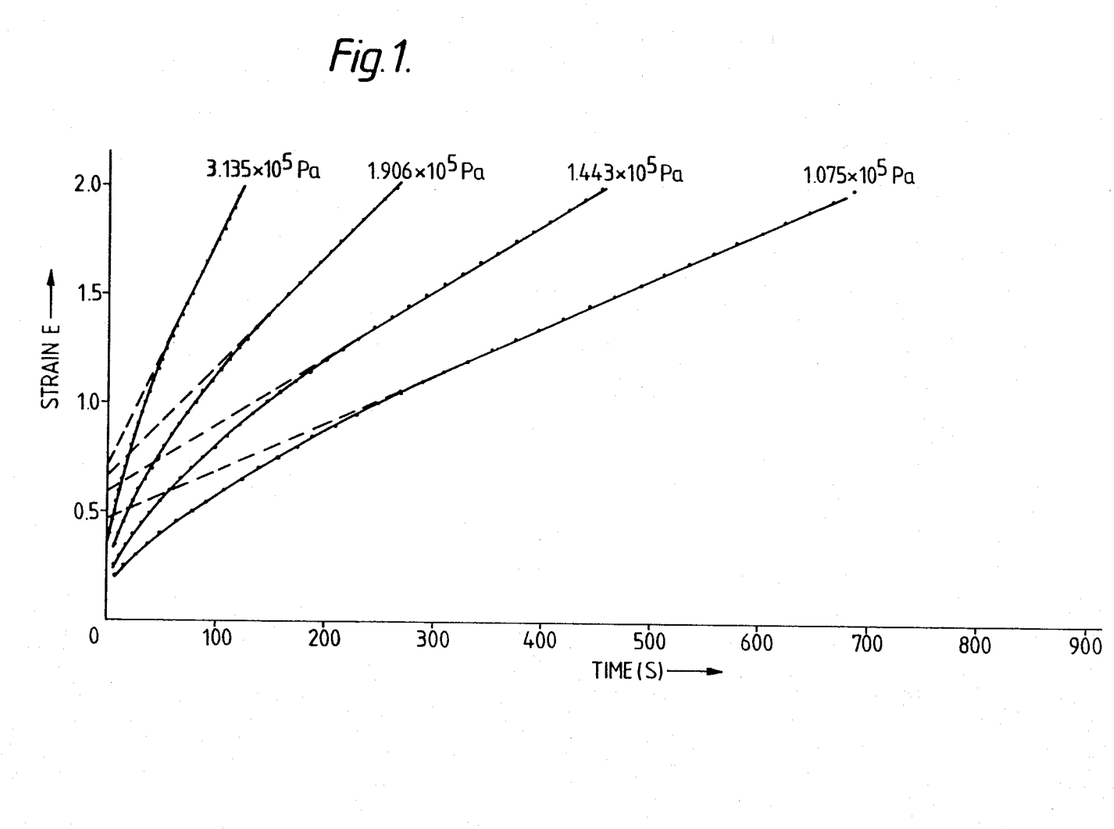
FIG. 1 presents constant stress creep curves at 140° C. for ABS resins, for comparative purposes.

FIG. 1 shows the constant stress creep curves for an ABS resin containing about 30% by weight of material insoluble in methylethylketone and having a glass transition temperature of about 105° C. The polybutadiene content of the ABS resin is 20% by weight. The continuous phase SAN polymer in this resin has a number average molecular weight of approximately 42000, an S/AN weight ratio of 1.8/1 and a ratio of weight average molecular weight to number average molecular weight of approximately 3.5.

Figure 2:
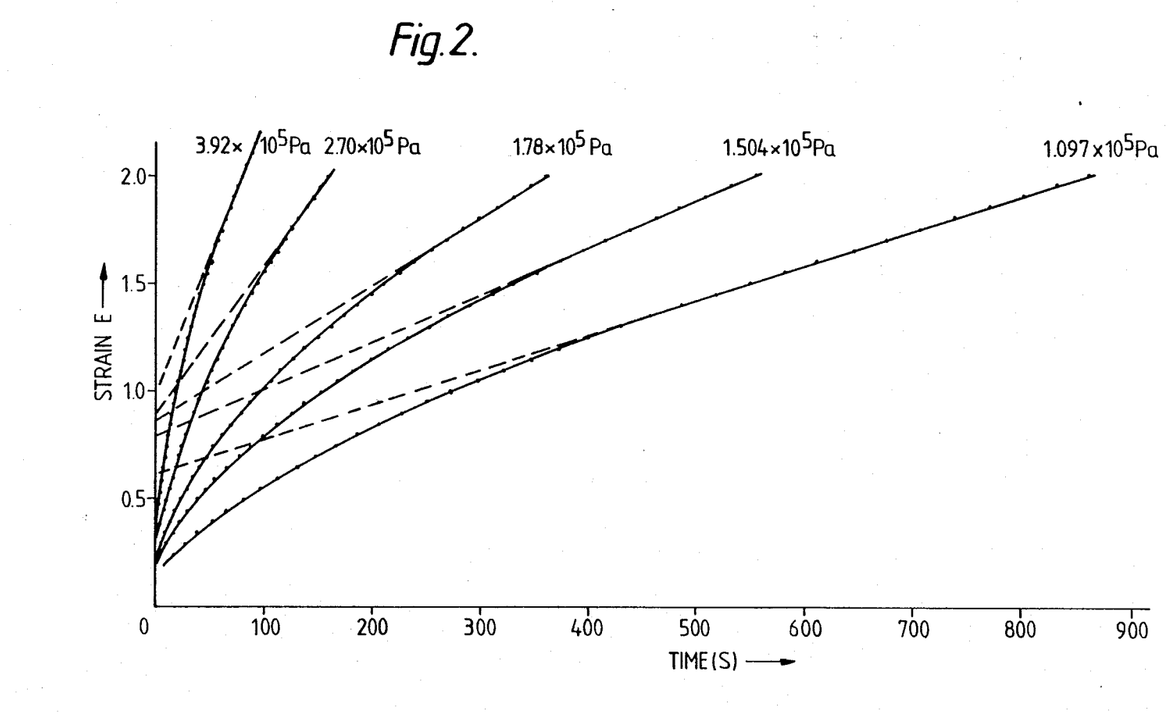
FIGS. 2 and 3 present Constant Stress Creep Curves at 140° C. for resin compositions comprising ABS and ultra high MW Styrene-Acrylonitrile copolymer (UHMW-SAN) at levels of 2 and 4 phr, respectively, according to this invention.

FIG. 2 shows the constant stress creep curves for a composition consisting of the same ABS resin as used in producing the curves of FIG. 1 to which has been added 2 parts by weight per 100 parts by weight of the ABS resin of an UHMW-SAN copolymer having a number average molecular weight of $1.6 \times 10^6$. This UHMW-SAN has a styrene/acrylonitrile ratio of 71/29 and is commercially available as "Plastiflo AO1" manufactured by Ugfine Kuhlmann SA.

Figure 3:
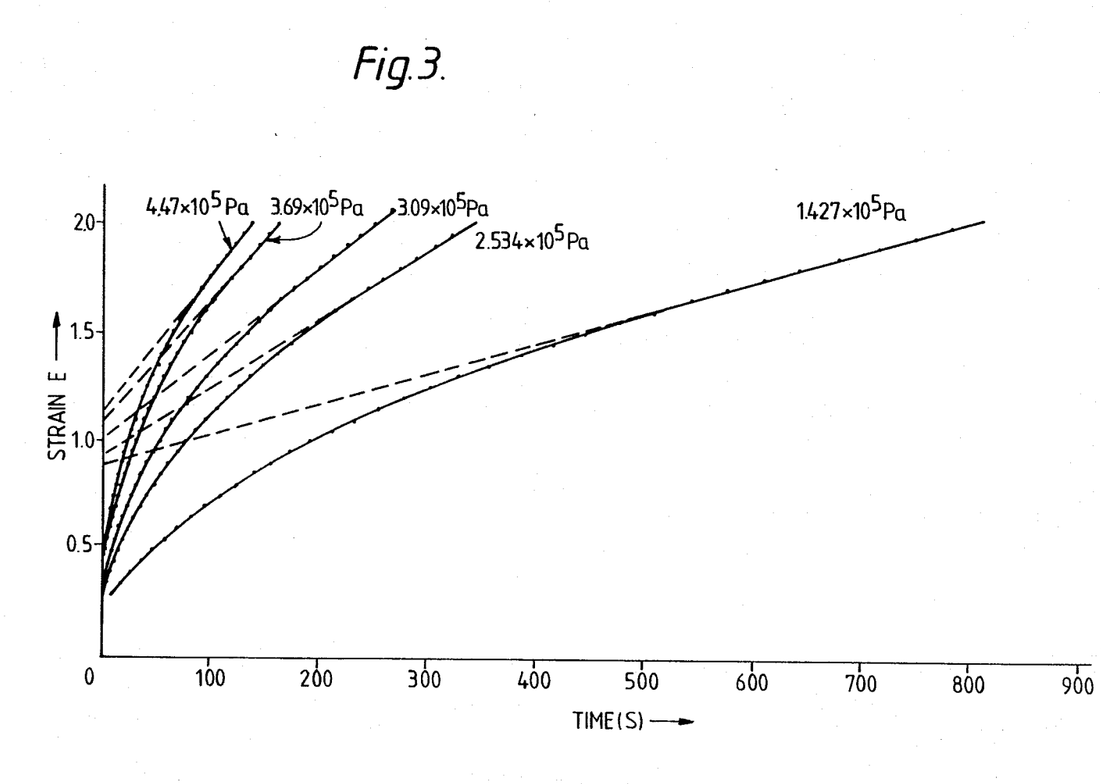

FIG. 3 shows curves obtained from a composition similar to that employed in producing the curves of FIG. 2, but containing 4 parts by weight per 100 parts by weight of the ABS resin of the UHMW-SAN.

As can be seen from FIGS. 1, 2 and 3, the strain level (Hencky strain) at which a constant rate of deformation is reached is increased by the addition of the UHMW-SAN copolymer. The rate of stress relaxation after cessation of steady state shear flow has been shown to be relatively unaffected by the presence of the UHMW-SAN copolymer but "die swell" or "extrudate swell" has been found to be strongly affected, that is increased, by the presence of the UHMW-SAN copolymer.

Similar improvements in properties have been found to exist for moulding compositions which not only comprise, as base resin, the first styrenic monomer/nitrile copolymer but also another thermoplastic polymer, in particular a vinyl chloride polymer. Polymer blends of ABS and PVC generally possess properties intermediate between those of the individual polymers. In processes involving elongational flow, such as vacuum-forming or thermoforming, the PVC component of the blend reduces the maximum elongation ratio that can be reached without rupture, and this severly limits the number of applications for such blends.

The processing properties of PVC-based compositions have been improved by adding small amounts of high molecular weight acrylic process aids, and this also results in improved high temperature melt elongation properties (Pure and Applied Chemistry, 55, No. 1, pages 177 to 190, 1983). It has now been found that improvements in the hot elongation properties of blends of ABS and PVC can be obtained when using small amounts of UHMW-styrenic monomer/nitrile copolymers. The quantities required depend upon the requirements of the process and can vary depending upon the relative efficiency of the UHMW-styrenic monomer/nitrile copolymer, the properties of the other blend components and their relative ratio in the blend. Also additives, such as property modifiers (nitrile rubbers and chlorinated polyethylene for example), plasticisers, stabilisers and lubricants may have an effect on elongation properties. In general, amounts of from 0.1 to 20, preferably 1 to 6, more preferably 2 to 4, parts by weight per 100 parts by weight of the base resins of the second copolymer are effective.

Figure 4:
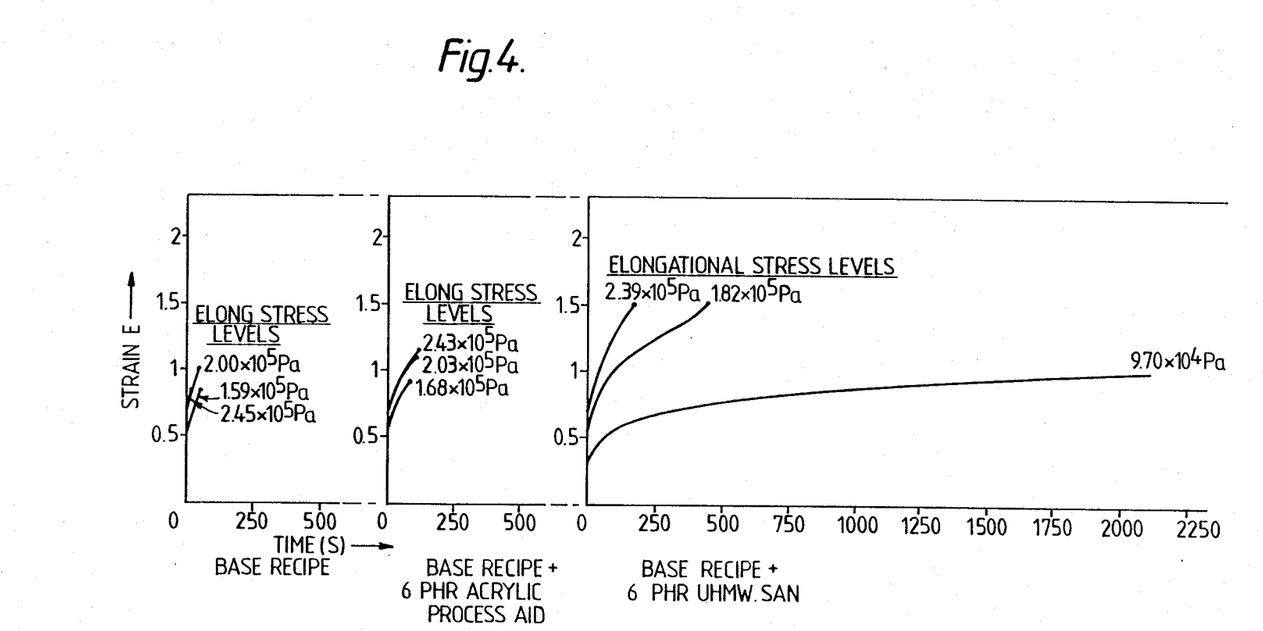
FIG. 4 compares the Elongational Hot Creep properties at 150° C. for plasticised ABS/PVC compositions, with no process aid, with 6 phr of a commercial prior art acrylic process and with 6 phr of UHMW-SAN, according to this invention.

FIG. 4 provides elongational hot creep curves obtained in the same manner as the curves of FIGS. 1 to 3, but at 150° C. for three formulations using the same base recipe, namely a recipe comprising:

40 phr ABS (Polybutadiene content 30% by weight, number average molecular weight of the SAN about 48000 as measured by Gel Permeation Chromatography)

40 phr PVC (suspension polymerised polymer, K-factor 71)

20 phr plasticiser (di-iso-dodecylphthalate)

3 phr stabiliser (Sn-type, commercially available as Irgastab 17M) (phr=parts by weight per 100 parts by weight of resin).

A reference formulation contained no polymeric additive. A further reference composition contained 6 phr acrylic process aid (Rohn and Haas "Paraloid K120 N", a high molecular weight copolymer of 95% methyl methacrylate and 5% ethyl acrylate). A formulation made in accordance with the invention contained 6 phr of the UHMW-SAN copolymer used in producing the curves of FIGS. 1 to 3, namely "Plastiflo AO1". As shown by the curves of FIG. 4, the UHMW-SAN copolymer provides much better results than does the acrylic process aid in that far higher strain levels may be obtained before repture of the samples occurs.

When instead of the UHMW-SAN copolymer used to provide the curves of FIGS. 1 to 4 there was used a UHMW-SAN copolymer having a bimodal molecular weight distribution and an 80/20 (weight based) S/AN ratio (number average molecular weight of the high molecular weight fraction about $1.8 \times 10^6$: and number average molecular weight of the lower molecular weight fraction about 84000) it was found that the low molecular weight fraction had a lowering effect on the viscosity of the blend, both in elongation and in shear. Strongly improved elongation at break properties were manifested by the compositions containing the UHMW-SAN copolymers, whether monomodal or bimodal in their molecular weight distribution. The high molecular weight fraction of the bimodal polymer is the active ingredient in obtaining high elongation at break levels.

Figure 5:
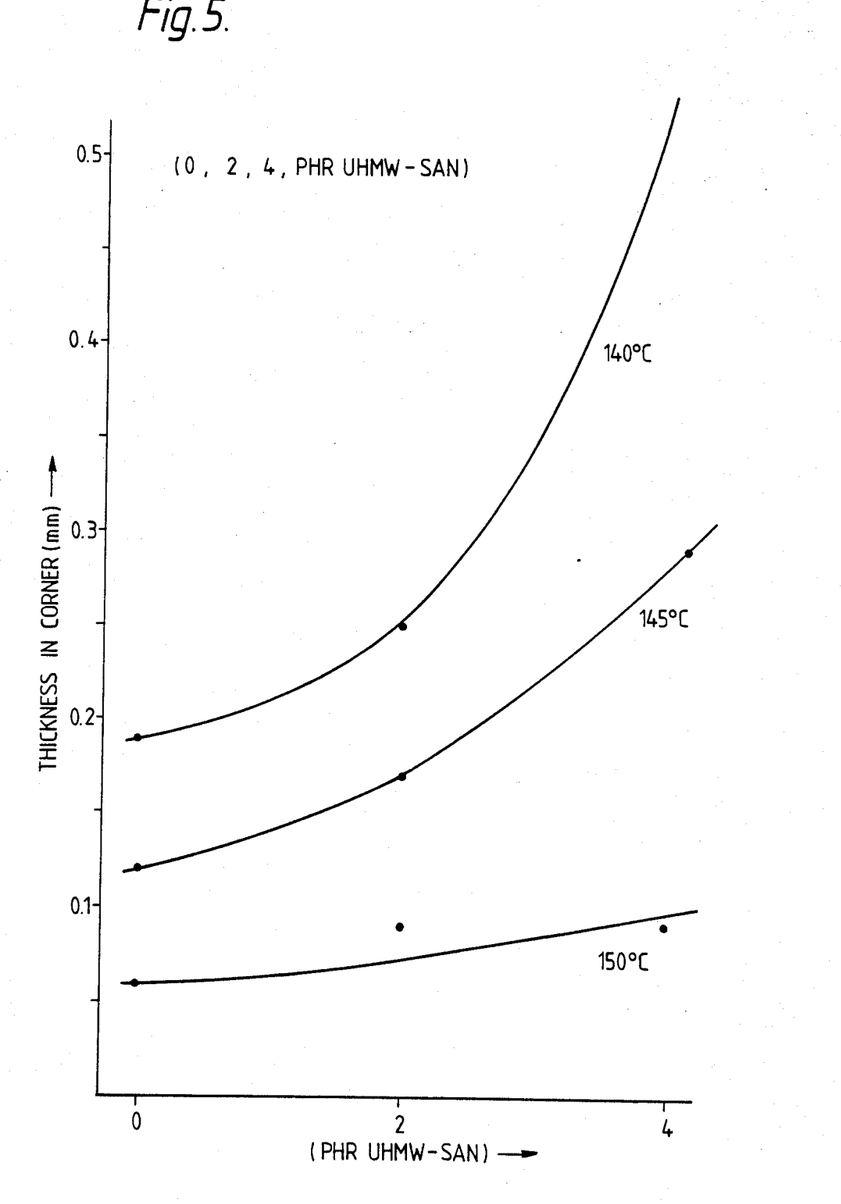
FIG. 5 compares the corner thickness of vacuum-formed ABS compositions with varying levels of UHMW-SAN.

The improvement in thickness distribution which can be obtained in accordance with the invention when shaped articles are formed by molding a composition containing the UHMW-styrene monomer/nitrile copolymer can clearly be seen from FIG. 5. FIG. 5 illustrates the results obtained, in terms of corner thickness, when moulding an ABS resin formulation containing 0, 2 or 4 phr of an UHMW-SAN copolymer ("Plastiflo AO1").

Figure 6:
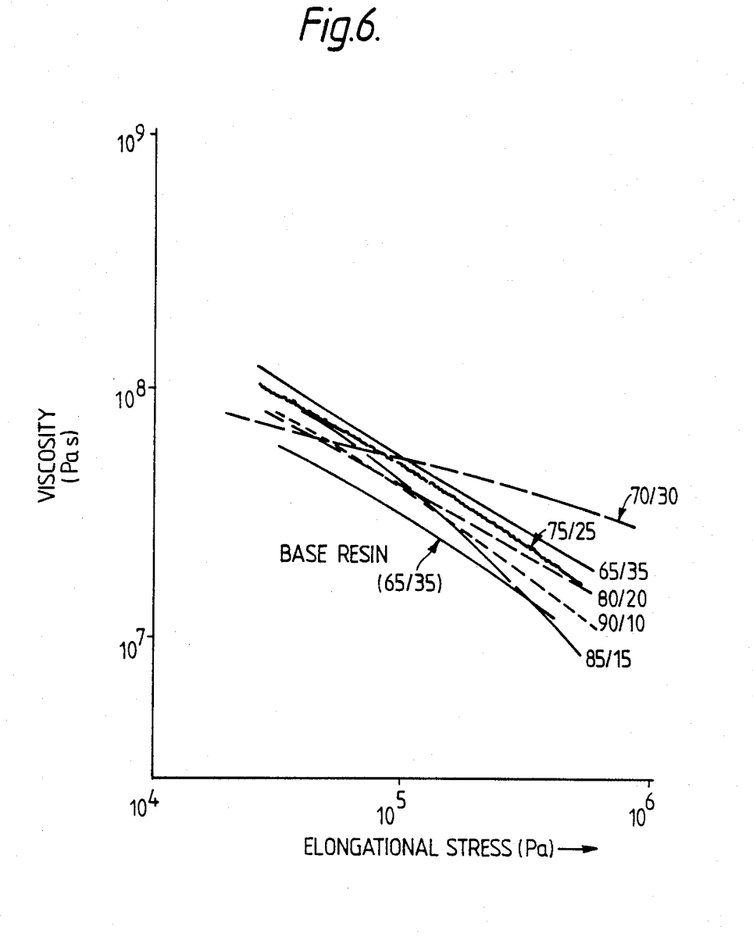
FIGS. 6 and 7 graphically present Elongational Viscosity vs Stress Data at 150° C. over a range of Compositions.
Figure 7:
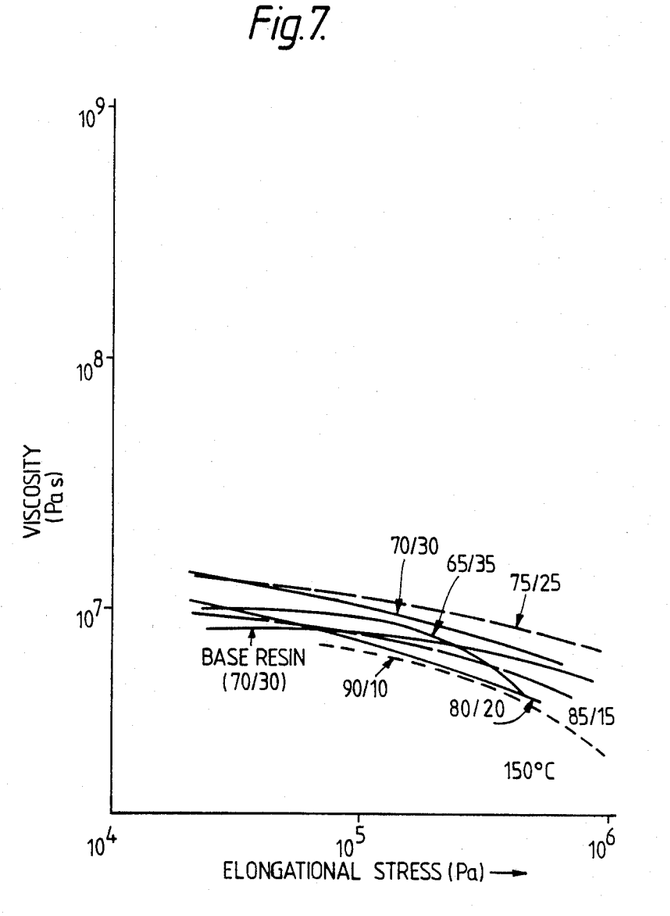

FIGS. 6 and 7 are plots of elongational viscosity against stress at 150° C. and illustrate the desirability of more or less matching the weight ratio of styrenic monomer to ethylenically unsaturated nitrile in the additive resin to that in the base resin. In FIGS. 6 and 7 are plotted the curves for base resins having styrene/acrylonitrile weight ratios of 65/35 and 70/30, respectively and for blends comprising 94 phr of base resin and 6 phr of UHMW additive resin in which the styrene/acrylonitrile weight ratio is variously 90/10, 85/15, 80/20, 75/25, 70/30 and 64/35. As can be seen from the results, the preferred response in which there is least change in elongational viscosity with stress is manifested when the styrene/acrylonitrile weight ratio of the additive resin is slightly higher than that of the base resin (70/30 in FIG. 6 and 75/25 in FIG. 7).

As mentioned above the creep resistance of shaped articles prepared in accordance with the invention is significantly improved. A pipe grade ABS composition containing only 2 phr of UHMW-SAN shows a significant reduction in deformation after exposure to strains of 15 MPa for times in excess of $3 \times 10^5$ seconds, when compared with a composition not containing the UHMW-SAN. The base resin used in these experiments is a typical resin intended for pressure pipe applications having a styrene/acrylonitrile weight ratio of 65/35 and a molecular weight of 58000. Even better trends in creep resistance improvement are shown by compositions containing base resins having a styrene/acrylonitrile weight ratio of 1.8/1 and molecular weights of 48000 and 44000 with butadiene contents of 30%.

Incorporation of the UHMW-SAN surprisingly has no significant effect upon impact resistance, provides an improved Vicat heat performance and has relatively little effect upon shear viscosity. The invention thus provides surprising benefits and almost no drawbacks.

We claim:

1. A polymer blend comprising:
   (a) 100 pbw of an impact-modified base resin comprising a first copolymer of a styrenic monomer and an ethylenically unsaturated nitrile, and an impact modifier therefor, said first copolymer having a number average molecular weight of from $3 \times 10^4$ to $1 \times 10^5$; and (b) from 0.1 to 20 parts by weight of a second copolymer consisting of said styrenic monomer and said ethylenically unsaturated nitrile, said second copolymer having a number average molecular weight of from $3 \times 10^5$ to $3 \times 10^6$.

2. The polymer blend of claim 1 wherein the monomer weight ratio of styrenic monomer to ethylenically unsaturated nitrile in components (a) and (b) is from about 65:35 to about 90:10.

3. The polymer blend of claim 1 wherein said styrenic monomer is styrene and said ethylenically unsaturated nitrile is acrylonitrile.

4. The polymer blend of claim 1, wherein the impact modifier comprises a polymer of 1,3-butadiene.

5. The polymer blend of claim 1 wherein the impact modifier is a rubbery copolymer of 1,3-butadiene, styrene and acrylonitrile.

6. A polymer blend comprising:
(a) 100 pbw of an impact-modified base resin comprising a first copolymer of a styrene and an acrylonitrile, and an impact modifier therefor, the weight ratio of said styrene to said acrylonitrile in said first copolymer being from about 65:35 to about 90:10, said first copolymer having a number average molecular weight of from about $3.5 \times 10^4$ to about $7 \times 10^4$; and (b) from 1 to 6 parts by weight of a second copolymer consisting of said styrene and said acrylonitrile, said second copolymer having a number average molecular weight of from $5 \times 10^5$ to $2 \times 10^6$.

7. The polymer blend of claim 6 wherein the impact modifier is a rubbery copolymer of 1,3-butadiene, a styrene and an acrylonitrile.

8. A method for improving the thermoforming characteristics of a molding resin comprising a first copolymer of a styrene monomer and an acrylonitrile monomer and a rubbery impact modifier, said first copolymer has a number average molecular weight of from about $3.5 \times 10^4$ to about $7 \times 10^4$, said method comprising blending therewith from 0.1 to 20 parts by weight, per 100 parts by weight of said molding resin, of a second copolymer consisting of said styrene monomer and said acrylonitrile monomer, said second copolymer having a number average molecular weight from $5 \times 10^5$ to $2 \times 10^6$.

9. The method of claim 8 wherein the monomer weight ratio of said styrene to said acrylonitrile of said first copolymer is from about 65:35 to about 90:10.

10. The method of claim 8 wherein the impact modifier is a rubbery copolymer of 1,3-butadiene, styrene and acrylonitrile.

* * * * *